2 Sheets--Sheet 1.

E. A. JONES & C. W. JONES.
Fruit-Driers.

No. 152,644.

Patented June 30, 1874.

Attest:
W. W. Sprague
Ed Barthel

Inventors:
E. A. Jones
C. W. Jones
By Attorney
Thos. S. Sprague

2 Sheets--Sheet 2.

E. A. JONES & C. W. JONES.
Fruit-Driers.

No. 152,644. Patented June 30, 1874.

Attest:
W. W. Sprague
Ed. Barthel

Inventors:
E. A. Jones
C. W. Jones
By Attorney
Thos. S. Sprague

UNITED STATES PATENT OFFICE.

EDGAR A. JONES, OF STURGIS, AND CHARLES W. JONES, OF CENTREVILLE, MICHIGAN.

IMPROVEMENT IN FRUIT-DRIERS.

Specification forming part of Letters Patent No. 152,644, dated June 30, 1874; application filed May 22, 1874.

*To all whom it may concern:*

Be it known that we, EDGAR A. JONES, of Sturgis, and CHARLES W. JONES, of Centreville, in the county of St. Joseph and State of Michigan, have invented a certain new and useful Fruit-Drier, of which the following is a specification:

The object of our invention is to so construct and arrange a series of chambers placed side by side on the second floor of a building, each chamber being adapted to receive trays or screens containing fruit, and connected at the bottom with the air-trunk of a hot-air furnace, and at the top with a flue connected with an exhaust-fan, that the heated-air currents may be caused to circulate through the several chambers independently of each other, and back into the furnace, or be discharged into the open air, or a portion be so discharged, and the remainder be returned to the furnace, the chambers being also provided with air-valves so arranged that the temperature of each chamber may be regulated to the requirements of the matter being treated therein, regardless of the temperature of the other chambers.

Figure 1:
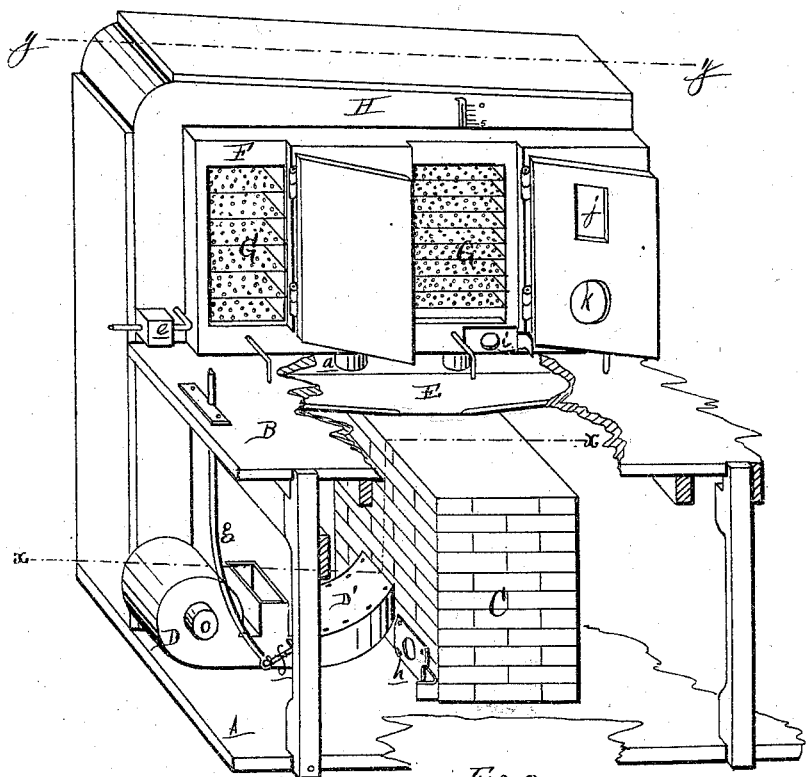
Figure 2:
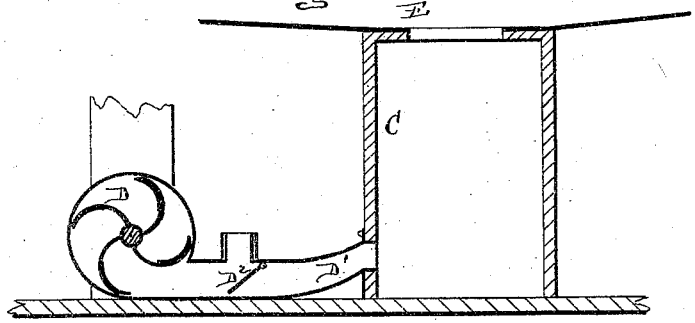
Figure 3:
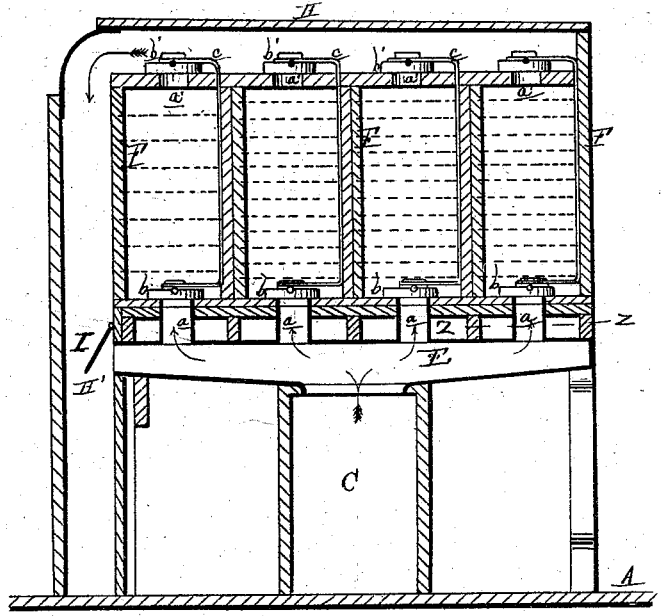
Figure 4:
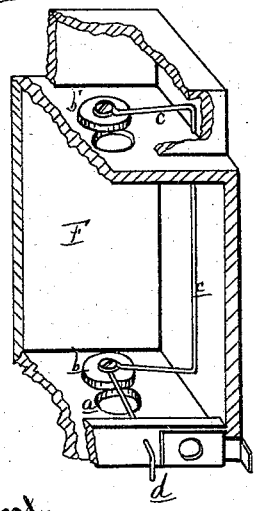
Figure 5:
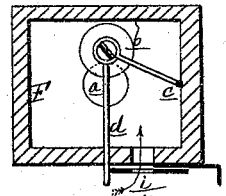

Figure 1, Sheet 1, is a perspective view of our drier as erected in a building, a portion of which is shown in section. Fig. 2 is a longitudinal vertical section of the blower and trunk at $x$ $x$. Fig. 3, Sheet 2, is a vertical transverse sectional elevation at $y$ $y$. Fig. 4 is a sectional perspective view of a drying-chamber, showing the arrangement of its valves. Fig. 5 is a horizontal section at $z$ $z$, showing the cold-air inlet and regulating-slide.

In the drawing, A represents the basement, and B the first or any other floor above it in a building. C is an air-heating furnace of suitable construction, with which is connected the blast-pipe $D^1$ of an exhaust-fan, D, driven from any convenient source of power. E is a hot-air trunk, communicating with the top of the furnace. F are chambers entirely disconnected from each other, although placed side by side. The trunk E communicates with the bottom of each chamber through a short pipe, $a$. G are fruit trays or screens of wire-cloth or other material of open texture, adapted to support the fruit or vegetables to be dried, which trays are supported, one above the other, on cleats, or in grooves in the sides of said chambers, in the top of each of which is an outlet, $a'$, for the heated-air currents, which are more or less charged with moisture. $b$ is a valve, pivoted by a central stud on its top to the lower arm of a C-shaped valve-stem, $c$, whose vertical arm is journaled in a groove in one side of the chamber. To its upper arm is pivoted a valve, $b'$, both valves being simultaneously operated by a valve-rod, $d$, coupled to the pivot of the lower, and extending through an opening in the front of the chamber. H is an exhaust-trunk, which extends along the top of all the chambers, and includes their several openings $a'$ and valves $b'$. At one end it is closed, while the other end, $H'$, is dropped to communicate with the exhaust-fan, being intersected, however, by an open end of the hot-air trunk E, which is closed by a self-acting flap-valve, I, whose crank-arm is provided with a sliding weight, $e$, the purpose of which valve will be presently explained. The blast-pipe $D^1$ of the fan is provided with a cut-off valve, $D^2$, whose crank $f$ is connected with a rod, $g$, passing up through a plate in the floor above, by opening which valve (which thereby cuts off the blast from the furnace) the air and vapors are exhausted from the chambers by the fan, and discharged into the open air. By closing the valve more or less, a part or the whole volume of the air drawn from the chambers may be returned into the furnace, to be again circulated through the fruit-chambers after being raised in temperature, thereby economizing in the fuel required to heat the air.

The valves $b$ $b'$ permit any chamber to be cut off from the circulating current without interfering with any other chamber; but, if it should so happen that all the chambers were cut off at the same time, or but one or two chambers were in use, the pressure of air in the trunk E would open the valve I, and let the whole or a part of the volume of air in motion circulate through the trunk $H'$ and fan, and into the furnace again. When the circulation from the fan into the furnace is cut off by the valve $D^2$, fresh air can be admitted to the furnace through an opening therein fitted with a slide, $h$.

$i$ is a slide fitted to the front of the lower part of each chamber over an opening therein, through which cold air can be admitted to modify or temper the heat in any chamber containing articles which require to be dried at a lower temperature.

The door of each chamber is fitted with a glass, $j$, through which the condition of the contents can be observed; also, with a plate, $k$, pivoted over a hand-hole, through which a sample of the article being dried can be withdrawn without being obliged to open the entire door, and thus cool down the chamber.

What we claim as our invention, and desire to secure by Letters Patent, is—

1. The combination, with the air-heating furnace C and exhaust-fan D, of the air-trunk E and a series of independent drying-chambers, F, connected therewith and with the exhaust-trunk H H', the said chambers being provided with the valves $b$ $b'$, substantially in the manner and for the purpose set forth.

2. In combination, the valves $b$ $b'$, arranged to cover the openings $a$ $a'$, as described, the valve-stem $e$, and rod $d$, constructed and arranged substantially as described and shown.

3. The combination, with the exhaust-trunk H' and hot-air trunk E, of the self-acting valve I, as and for the purpose set forth.

4. The combination of the valve $D^2$ in the blast-pipe $D^1$, the exhaust-fan D, the exhaust-trunk H', and the furnace C, constructed and arranged substantially as described and shown.

EDGAR A. JONES.
CHARLES W. JONES.

Witnesses:
H. S. SPRAGUE,
W. W. SPRAGUE.